Dec. 12, 1950  C. L. WEAVER  2,533,702
PILOT OPERATED CONTROL SYSTEM FOR AIRCRAFT
Filed Aug. 14, 1945  3 Sheets-Sheet 3
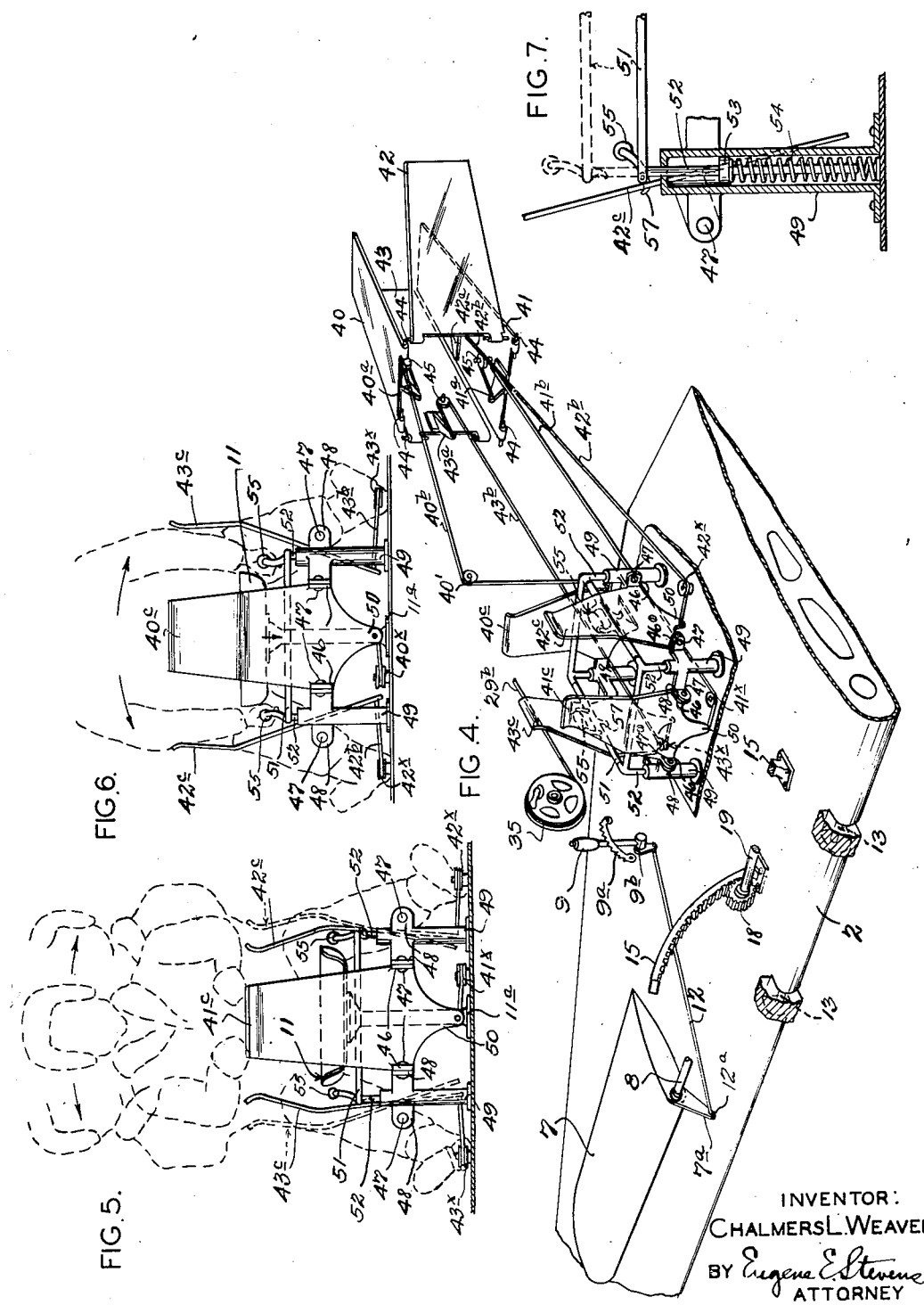
INVENTOR:
CHALMERS L. WEAVER
BY Eugene E. Stevens
ATTORNEY Patented Dec. 12, 1950

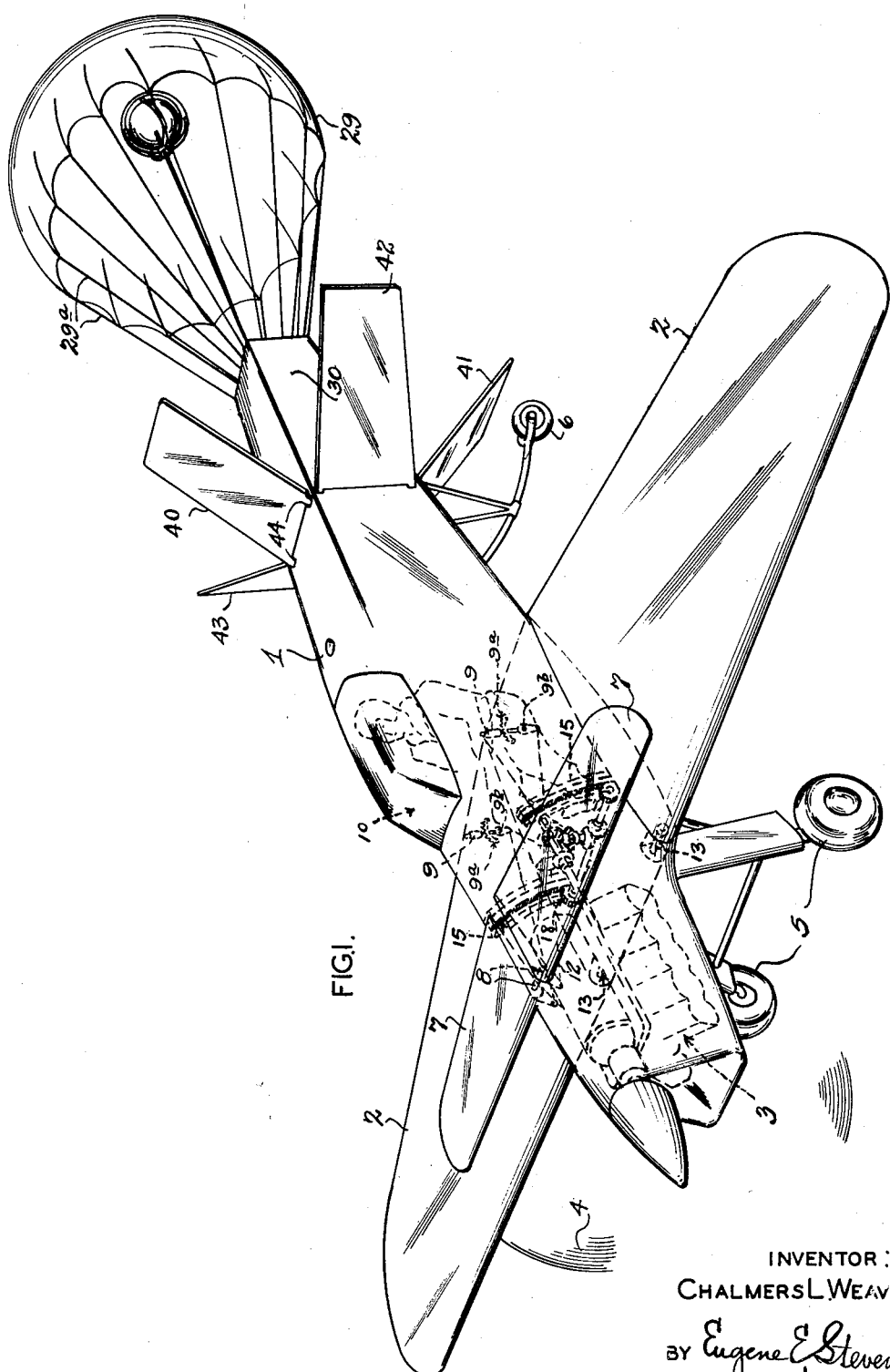

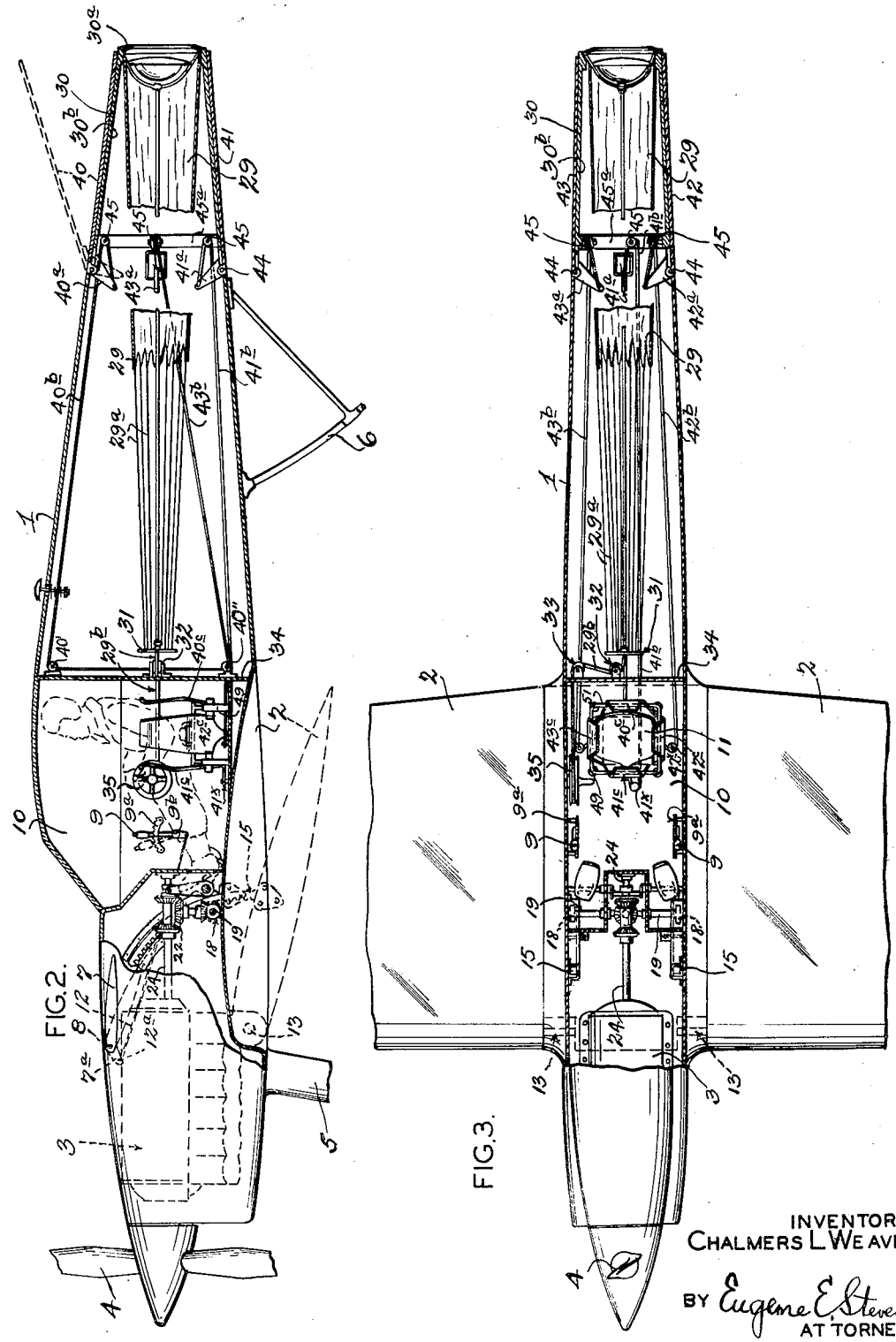

2,533,702

UNITED STATES PATENT OFFICE 2,533,702

PILOT OPERATED CONTROL SYSTEM FOR AIRCRAFT

Chalmers L. Weaver, St. Louis, Mo.

Application August 14, 1945, Serial No. 610,715

8 Claims. (Cl. 244—83)

My invention relates to improvements in airplanes and is applicable to both those of the powered and glider variety, being an improvement over the disclosure of my Patent #1,544,787, dated July 7, 1925.

Briefly and generally stated, the invention has among its primary objects, the provision of novel steering and braking means for airplanes same being of comparatively simple construction, readily operable and the braking means enabling the pilot to bring the plane to a stop within a short distance after landing.

More specifically, it is an object of the invention to provide in an airplane a novel tail construction embodying outwardly swingable right-angularly disposed wall panels which are not only independently operable for steering the plane but which may also be simultaneously operated for braking purposes.

Additionally, the invention aims to provide a steering and braking wall panel incorporating fuselage tail for an airplane wherein the operation of the panels may be and preferably is accomplished by body movement of the pilot in his seat.

The invention also resides in certain novel features of construction, combination and arrangement of the various parts and in modes and methods of operation, all of which will become apparent to those skilled in the art from a study of the following detailed description of the now preferred embodiment which is illustrated in the accompanying drawings, in which:

Fig. 1 is a perspective view of an airplane in flight and illustrating the braking parachute in operative position and likewise the steering panels thrown outwardly;

Fig. 2 is a side elevational view partly in longitudinal section of an airplane embodying my invention;

Fig. 3 is a fragmentary plan view, partly in horizontal section;

Fig. 4 is a fragmentary perspective view illustrating the steering panels and the control means therefor, the view also illustrating a portion of the main wing operating means and one of the ailerons;

Fig. 5 is a front elevational view of the pilot's seat and associated body operated means for controlling the steering panels of the tail;

Fig. 6 is a rear elevational view of the pilot's seat and associated panel controlling means and illustrates particularly the means for simultaneous control of the steering panels; and Fig. 7 is a detailed view in vertical section of one of the supporting posts which are incorporated in the means for simultaneously operating the steering panels.

Referring to the drawings in detail, numeral 1 designates the fuselage of an airplane having the main laterally extending wings 2 at opposite sides adjacent the lower forward portion thereof rearwardly of the motor 3 which has the propeller 4. The forwardly located landing gear 5 may be of the usual construction and is secured to the fuselage in the conventional way as is also the tail wheel and its support 6 although it is to be noted that the latter is located further forwardly than is customary for reasons that will become apparent as the description proceeds.

As best illustrated in Figs. 1 and 2, I provide smaller wings or ailerons 7 which are disposed above the main wings 2 and have their inner forward end portions horizontally pivoted as at 8 to the fuselage 1. The ailerons 7 are adapted to be actuated about their horizontal pivots 8 and function as usual as an element of the means for directing and controlling the flight of the craft. The control means 9, 9a, 9b, 12, 12a and 7a for ailerons 7 is immaterial to the invention claimed herein.

As in my prior patent, earlier mentioned herein, it is contemplated using the main wings 2 as brakes for the purpose of enabling the plane to be brought quickly to a stop after it has landed.

Wings 2 are pivoted as at 13 to the fuselage and are adapted to be actuated up or down by the engine driven shaft 24 through clutch controlled gearing which includes pinions 18 on shaft 19 meshing with wing-carried rock bars 15. The instant invention is not, however, concerned with this specific structure.

As best shown in Fig. 1, the plane terminates in a box-like tail 30 having flat top, bottom and sides and provided with a chamber 30b opening from the rear end in a tapered valve seat 30a. The chamber 30b is adapted to house a braking parachute 29 having the lanyards 29a connected thereto at one end, as usual, and having their opposite ends connected adjacent the margin of a disc 31 as indicated in Figs. 2 and 3. The braking parachute 29, per se, its retaining and releasing means are claimed in my copending application Serial No. 735,295, filed March 18, 1947, now Patent No. 2,525,844, issued on October 17, 1950. For purposes of this specification it suffices to note that the parachute retaining cable 29b is guided by pulleys 32, 33 to reel 35 adjacent the pilot's seat 11 (Figs. 2 and 3) and wound thereon.

Coming now to the novel means employed for steering the plane, it will be noted that the four-sided box-tail 30 is provided with the steering flaps 40, 41, 42 and 43, which are stiff panel-like construction and pivoted as at 44 to the top, bottom, left and right sides, respectively, of the box-tail. Each of the flaps 40, 41, 42 and 43, has secured to its inner surface adjacent the front end and intermediate the side edges a rearwardly extending bracket arm. These bracket arms are designated by reference characters 40a, 41a, 42a and 43a, respectively. Actuating cables for the respective steering flaps are designated as at 40b, 41b, 42b and 43b, respectively, and are reverted about pulleys 45 attached to the endless interior shoulder 45a of the box-tail, the ends of said cables being attached to the respective bracket arms of the steering flaps. The steering flap actuating cables 40b, 41b, 42b and 43b, extend forwardly adjacent the inner surfaces of the fuselage wall and are passed about pulleys 40x, 41x, 42x and 43x, respectively, which are secured to the floor of the cockpit 10 outwardly of the respective actuating panels 40c, 41c, 42c and 43c, which are arranged at the rear, front, left and right sides, respectively, of the pilot's seat 11. As best shown in Fig. 4, the steering flap-actuating cables are secured to depending tongues 50 of said flap actuating panels.

The flap actuating panels, 40c, 41c, 42c and 43c, have adjacent their lower ends the rearwardly turned ears 46 which have the pivot connections 47, with the similar contiguous ears 48, which are carried by cylinder posts 49 mounted on the floor of the cockpit 10.

In the case of the top panel 40, Fig. 4 illustrates an appropriate supplementary pulley 40' adjacent the top of the fuselage and carried by the rear wall of the cockpit 10. The operating cable 40b of this top panel is led downwardly from the pulley 40' and is passed about a pulley 40'' likewise carried by the rear cockpit wall 34 and from this pulley 40'' said actuating cable leads to the cockpit floor carried pulley 40x, previously referred to. As will be appreciated, the supplementary pulleys 40', 40'' are necessary to dispose the top panel actuating cable 40b in its appropriate position adjacent the top of the fuselage, as indicated in Fig. 2.

Particular attention is directed to the steering flap actuating panels 40c, 41c, 42c and 43c, it being noted that the upper portions of same are inclined inwardly so as to be adapted to be engaged by the body of the pilot when he leans forward, backward or sideways. In this way, the pilot is enabled to selectively operate the appropriate steering panels 40, 41, 42 and 43. For instance, when he leans forward to engage the panel 41c, the bottom steering flap is operated outwardly to cause the plane to nose downwardly. When he leans rearwardly to force the panel 40c outwardly, the top steering flap 40 will be raised causing the plane to take an upward course. A leaning against the left panel 42c will, it will be seen, swing the left panel 42 outwardly to effect a left turn, and it follows that when the panel 43c is leaned against by the pilot, the right steering panel will be thrown outwardly causing the plane to go into a right turn.

Figs. 5 and 6 illustrate that the lower halves of the steering flap actuating panels 40c, 41c, 42c and 43c, are inclined inwardly. This is important because it enables me to provide for simultaneous operation of the steering flap operating panels. In carrying out this phase of the invention, I provide a rectangular panel actuating frame 51 having the corner rods 52 slidably working in the cylinder posts 49. Each corner rod 52 has within its cylinder post 49 a fixed shoulder 53 which acts as a stop for a coil spring 54 whose function is to normally actuate the panel operating frame 51 upwardly to the dotted line position of Fig. 7. It is evident from Fig. 3 that the panel actuating frame 51 encloses the pilot's seat 11 and Figs. 4, 5 and 6 disclose said panel actuating frame as having handles 55 at opposite sides. When the pilot desires to actuate all of the steering flaps 40, 41, 42 and 43 outwardly, as in Fig. 1, for the purpose of slowing the plane down in flight, he simply grasps the handles 55 as indicated in Fig. 6, and presses said frame 51 downwardly causing it to simultaneously engage the inwardly inclined portions of the steering flap operating panels 40c, 41c, 42c and 43c. This throws all of said panels outwardly bringing the steering flaps 40, 41, 42 and 43, to the Fig. 1 position. When the panel actuating frame 51 is permitted to rise again under the action of the coil springs 54, the steering flaps 40, 41, 42 and 43, resume their normal position which is in flat contact with the proximate surfaces of the box-tail 30 as shown in Figs. 2 and 3.

The flap-operating panels 42c and 43c each have holes adapted to receive hooks 57 carried by handles 55 (see Fig. 7) so that operating frame 51 can be held depressed to retain the tail flaps 40, 41, 42 and 43 in outwardly thrown braking position.

While I have illustrated and described one form of the invention as required by the patent statutes, it will be obvious that my inventive concept is susceptible of various other mechanical expressions within the spirit and scope of the subject matter claimed.

Having thus described my invention, what I claim is:

1. In an airplane, a fuselage having a tail providing top, bottom and side surfaces, a relatively rigid panel-like steering and braking flap transversely pivoted to each of said surfaces, an angle bracket secured to each of said flaps and having an arm projecting into said fuselage, a flap operating cable secured to each of said bracket arms, a cockpit in the forward portion of said fuselage and providing a pilot's seat, spaced upstanding tubular posts secured to the cockpit floor and defining the corners of a rectangle, a torso-actuated panel at each side of said post-provided rectangle and horizontally pivoted intermediate its ends to adjacent corner posts, said respective flap actuating cables secured to the lower ends of different ones of said panels, direction changing means for guiding said cables and located outwardly of said post-provided rectangle, a frame having depending corner rods slidable in the respective tubular corner posts, yielding means in each of said corner posts and bearing against said depending rods for normally urging said frame upwardly, and said cable actuating panels having inwardly inclined portions above their pivots and disposed in the path of said frame when the latter is depressed against the action of said corner post contained yielding means whereby to effect simultaneous inward cable-pulling movement of said panels for effecting simultaneous outward actuation of said flaps to braking position.

2. In an airplane, a fuselage having a tail providing top, bottom and side surfaces, a relatively rigid panel-like steering and braking flap transversely pivoted to each of said surfaces, a flap-operating cable operatively secured to each of said flaps, a cockpit in the forward portion of said fuselage and providing a pilot's seat, spaced upstanding tubular posts secured to the cockpit floor and defining the corners of a rectangle, a torso-actuated panel at each side of said post-provided rectangle and horizontally pivoted intermediate its ends to adjacent corner posts, said respective flap actuating cables secured to the lower ends of different ones of said panels, direction changing means for guiding said cables and located outwardly of said post-provided rectangle, a frame having depending corner rods slidable in the respective tubular corner posts, yielding means in each of said corner posts and bearing against said depending rods for normally urging said frame upwardly, and said cable actuating panels having inwardly inclined portions above their pivots and disposed in the path of said frame when the latter is depressed against the action of said corner post contained yielding means whereby to effect simultaneous inward cable-pulling movement of said panels for effecting simultaneous outward actuation of said flaps to braking position.

3. In an airplane, a fuselage having a tail providing top, bottom and side surfaces, a relatively rigid panel-like steering and braking flap transversely pivoted to each of said surfaces, an angle bracket secured to each of said flaps and having an arm projecting into said fuselage, a flap operating cable secured to each of said bracket arms, a cockpit in the forward portion of said fuselage and providing a pilot's seat, shiftable front, rear and side pilot-torso-actuated members adjacent said pilot's seat, an operative connection between different ones of said torso-actuated members and the respective flap-operating cables, a manually shiftable frame-like member adjacent said torso-actuated members and said torso-actuated members having cam portions in the path of movement of said frame whereby to effect simultaneous operation of said flaps for braking purposes.

4. In an airplane, a fuselage providing a cockpit, a pilot's seat therein, multiple direction control elements shiftably carried by said fuselage, a pilot-torso engageable control member operatively connected to each of said direction control elements and located at different points adjacent the pilot's seat for selective actuation, and a shiftable member operatively associated with said control members for simultaneously actuating the same.

5. In an airplane, a fuselage having a tail providing top, bottom and side surfaces, a relatively rigid panel-like steering and braking flap transversely pivoted to each of said surfaces, a cockpit in the forward portion of said fuselage and providing a pilot's seat, shiftable front, rear and side pilot-torso-actuated members adjacent said pilot's seat, an operative connection between different ones of said torso-operated members and the respective flaps, a manually shiftable frame-like member adjacent said torso-actuated members, and said torso-actuated members having cam portions in the path of movement of said frame whereby to effect simultaneous operation of said flaps for braking purposes.

6. In an airplane, a fuselage providing a forward cockpit and pilot's seat therein, said fuselage providing independently shiftable means for directing the flight of the airplane in vertical and horizontal directions, independently shiftable front, rear and side pilot-torso-actuated members adjacent said pilot's seat, two of said torso-operated members being connected, respectively, to the fuselage-carried means for directing flight of the plane in horizontal directions and the other two of said torso-operated members being connected, respectively, to the fuselage-carried means for directing the flight of the plane in vertical directions, a manually shiftable frame-like member adjacent said torso-actuated members, and said torso-actuated members having cam portions in the path of movement of said frame whereby to effect simultaneous operation of said vertical and horizontal flight-controlling, fuselage-carried means for braking purposes while the airplane is in flight.

7. The combination set forth in claim 5, and said frame-like member and the respective torso-actuated members having cooperating locking means interengageable to retain said torso-actuated members in the operative frame-actuated position.

8. The combination set forth in claim 6, and said frame-like member and the respective torso-actuated members having cooperating locking means interengageable to retain said torso-actuated members in the operative frame-actuated position.

CHALMERS L. WEAVER.

REFERENCES CITED

The following references are of record in the file of this patent:

UNITED STATES PATENTS

| Number | Name | Date |
| --- | --- | --- |
| 1,061,917 | Malterner | May 13, 1913 |
| 1,085,575 | Curtiss | Jan. 27, 1914 |
| 1,332,743 | Mitton | Mar. 2, 1920 |
| 1,561,961 | Wendelken | Nov. 17, 1925 |
| 1,600,079 | Thomas | Sept. 14, 1926 |
| 1,914,448 | Murray | June 20, 1933 |
| 2,074,360 | Bounds | Mar. 23, 1937 |
| 2,360,116 | Elias | Oct. 10, 1944 |
| 2,363,732 | Jenkins | Nov. 28, 1944 |